(12) United States Patent
Pastrick et al.

(10) Patent No.: US 7,784,983 B2
(45) Date of Patent: *Aug. 31, 2010

(54) VEHICULAR EXTERIOR REARVIEW MIRROR ASSEMBLY

(75) Inventors: Todd W. Pastrick, Spring Lake, MI (US); Linda K. Molenkamp, Fruitport, MI (US); Roger L. Koops, Hamilton, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/037,409

(22) Filed: Feb. 26, 2008

(65) Prior Publication Data

US 2008/0144327 A1 Jun. 19, 2008

Related U.S. Application Data

(63) Continuation of application No. 11/505,268, filed on Aug. 16, 2006, now Pat. No. 7,334,925, which is a continuation of application No. 10/287,565, filed on Nov. 4, 2002, now Pat. No. 7,140,755, which is a continuation of application No. 09/938,182, filed on Aug. 23, 2001, now Pat. No. 6,474,853, which is a continuation of application No. 09/630,332, filed on Jul. 31, 2000, now Pat. No. 6,280,069, which is a continuation of application No. 09/420,658, filed on Oct. 19, 1999, now Pat. No. 6,099,155, which is a continuation of application No. 09/232,316, filed on Jan. 18, 1999, now Pat. No. 6,074,077, which is a continuation of application No. 08/934,490, filed on Sep. 19, 1997, now Pat. No. 5,863,116, which is a continuation of application No. 08/607,285, filed on Feb. 26, 1996, now Pat. No. 5,669,705, which is a continuation of application No. 08/333,412, filed on Nov. 2, 1994, now Pat. No. 5,497,305, which is a continuation of application No. 08/011,947, filed on Feb. 1, 1993, now Pat. No. 5,371,659.

(51) Int. Cl.
*B60Q 1/50* (2006.01)
*B60R 1/12* (2006.01)

(52) U.S. Cl. ...................... 362/494; 362/540

(58) Field of Classification Search ......... 362/140–144, 362/494, 496, 501, 511, 520, 522, 540, 542, 362/546; 340/468, 475; 359/602, 604, 876, 359/877

See application file for complete search history.

(56) References Cited

U.S. PATENT DOCUMENTS 1,096,452 A  5/1914  Perrin ........................ 362/495

(Continued)

FOREIGN PATENT DOCUMENTS

DE      2511406      9/1976

(Continued)

OTHER PUBLICATIONS

European Search Report for European Application No. EP96650012.6 which is based on related U.S. Appl. No. 08/426,591, now U.S. Patent No. 5,497,306.

(Continued)

*Primary Examiner*—Alan Cariaso
(74) *Attorney, Agent, or Firm*—Van Dyke, Gardner, Linn & Burkhart, LLP

(57) ABSTRACT

A vehicular exterior rearview mirror assembly has a reflectance element that is positionable by operation of electrically-operable actuator, and a turn signal light that is separate from the reflectance element and configured to project a beam of light that is directed at least rearward and that is observable to a driver of a second vehicle overtaking in an adjacent side lane. The beam of light is substantially unobserved by a driver of the equipped vehicle and provides a warning indication to the driver of the overtaking second vehicle that a lane change is intended. The mirror assembly includes a ground illumination light, separate from the reflectance element, configured to project a beam downwardly on at least one of (a) the side of the equipped vehicle and (b) a ground area adjacent an ingress or egress portion of the equipped vehicle.

21 Claims, 8 Drawing Sheets

U.S. PATENT DOCUMENTS

| | | | |
|---|---|---|---|
| 1,278,741 A | 9/1918 | Phelps | 362/83.1 |
| 1,353,253 A | 9/1920 | Livingston et al. | 362/494 |
| 1,415,465 A | 9/1922 | Nigh | 362/494 |
| 1,458,703 A | 6/1923 | Harris et al. | |
| 1,497,608 A * | 6/1924 | Strong | 362/494 |
| 1,563,258 A | 11/1925 | Cunningham | 362/83.1 |
| 1,602,094 A | 10/1926 | Badding | |
| 2,010,138 A | 8/1935 | Condon | 177/329 |
| 2,065,876 A | 12/1936 | Siegfried | |
| 2,235,181 A | 3/1941 | Thiel | 200/52 |
| 2,273,570 A | 2/1942 | Greenlees | 362/2.13 |
| 2,295,176 A | 9/1942 | Kelly | 362/329 |
| 2,414,223 A | 1/1947 | DeVirgilis | 240/4.2 |
| 2,457,348 A | 12/1948 | Chambers | 362/540 |
| 2,511,971 A | 6/1950 | Dalton | 362/329 |
| 2,562,687 A | 7/1951 | Anderson | 362/2.13 |
| 3,522,584 A | 8/1970 | Talbot | 340/98 |
| 3,596,079 A | 7/1971 | Clark | 362/71 |
| 3,601,352 A | 8/1971 | Jensen et al. | |
| 3,883,732 A | 5/1975 | Peterson et al. | 240/73 |
| 4,041,301 A | 8/1977 | Pelchat | 362/2.13 |
| 4,143,368 A | 3/1979 | Route et al. | 340/543 |
| 4,205,325 A | 5/1980 | Haygood et al. | 340/147 |
| 4,258,352 A | 3/1981 | Lipschutz | 340/53 |
| 4,274,078 A | 6/1981 | Isobe et al. | 362/98 |
| 4,281,899 A | 8/1981 | Oskam | 350/289 |
| 4,342,210 A | 8/1982 | Denningham | 70/278.1 |
| 4,368,868 A | 1/1983 | Urban | |
| 4,446,380 A | 5/1984 | Moriya et al. | 307/10.4 |
| 4,475,100 A | 10/1984 | Duh | 362/98 |
| 4,569,002 A | 2/1986 | English et al. | 362/80 |
| 4,583,155 A | 4/1986 | Hart | 362/285 |
| 4,626,084 A | 12/1986 | Kumai | 350/604 |
| 4,646,207 A | 2/1987 | Levin et al. | 362/80 |
| 4,661,800 A | 4/1987 | Yamazaki | 362/98 |
| 4,688,036 A | 8/1987 | Hirano et al. | 340/825.69 |
| 4,693,571 A | 9/1987 | Kimura et al. | 350/634 |
| 4,733,336 A | 3/1988 | Skogler et al. | 362/142 |
| 4,772,989 A | 9/1988 | Haraden | 362/80 |
| 4,778,265 A | 10/1988 | Fingerle et al. | |
| 4,807,096 A | 2/1989 | Skogler et al. | 362/142 |
| 4,808,968 A | 2/1989 | Caine | 340/71 |
| 4,809,137 A | 2/1989 | Yamada | 362/61 |
| 4,851,970 A | 7/1989 | Bronder | 362/66 |
| 4,866,417 A | 9/1989 | DeFino et al. | 340/429 |
| 4,868,722 A | 9/1989 | Haraden | 362/80 |
| 4,881,148 A | 11/1989 | Lambropoulos et al. | 361/172 |
| 4,890,907 A | 1/1990 | Vu et al. | 350/605 |
| 4,916,430 A | 4/1990 | Vu et al. | 340/463 |
| 5,014,167 A | 5/1991 | Roberts | 362/83.1 |
| 5,017,903 A | 5/1991 | Krippelz, Sr. | 340/472 |
| 5,038,255 A | 8/1991 | Nishihashi | 362/61 |
| 5,049,867 A | 9/1991 | Stouffer | 340/426 |
| 5,059,015 A | 10/1991 | Tran | 359/844 |
| 5,109,214 A | 4/1992 | Heidman, Jr. | 340/475 |
| 5,113,182 A | 5/1992 | Suman et al. | 340/825.31 |
| 5,132,882 A | 7/1992 | Alder | 362/80.1 |
| 5,151,824 A | 9/1992 | O'Farrell | 359/604 |
| 5,178,448 A | 1/1993 | Adams et al. | 362/83.1 |
| 5,179,471 A | 1/1993 | Caskey et al. | 359/603 |
| 5,206,562 A | 4/1993 | Matsuno et al. | 315/84 |
| 5,207,492 A | 5/1993 | Roberts | 362/30 |
| 5,223,814 A | 6/1993 | Suman | 340/525 |
| 5,287,101 A | 2/1994 | Serizawa | 340/815 |
| 5,303,130 A | 4/1994 | Wei et al. | 362/83.1 |
| 5,313,335 A | 5/1994 | Gray et al. | 359/839 |
| 5,371,659 A | 12/1994 | Pastrick et al. | 362/83.1 |
| 5,402,103 A | 3/1995 | Tashiro | 340/475 |
| 5,436,741 A | 7/1995 | Crandall | 359/15 |
| 5,448,397 A | 9/1995 | Tonar | 359/272 |
| 5,497,305 A | 3/1996 | Pastrick et al. | 362/83.1 |
| 5,497,306 A | 3/1996 | Pastrick | 362/83.1 |
| 5,499,169 A | 3/1996 | Chen | 362/83.1 |
| 5,587,699 A | 12/1996 | Faloon et al. | 340/475 |
| 5,624,176 A | 4/1997 | O'Farrell et al. | 362/83.1 |
| 5,660,457 A | 8/1997 | Lyons | 362/83.1 |
| 5,669,699 A | 9/1997 | Pastrick et al. | 362/83.1 |
| 5,669,704 A | 9/1997 | Pastrick | 362/83.1 |
| 5,669,705 A | 9/1997 | Pastrick et al. | 362/83.1 |
| 5,788,357 A | 8/1998 | Muth | 362/494 |
| 5,823,654 A | 10/1998 | Pastrick et al. | 362/83.1 |
| 5,863,116 A | 1/1999 | Pastrick et al. | 362/494 |
| 5,871,275 A | 2/1999 | O'Farrell et al. | 362/494 |
| 5,879,074 A | 3/1999 | Pastrick | 362/494 |
| 5,886,838 A | 3/1999 | Kuramoto | 359/841 |
| 5,938,320 A | 8/1999 | Crandall | 362/494 |
| 6,045,243 A | 4/2000 | Muth et al. | 362/494 |
| 6,074,077 A | 6/2000 | Pastrick et al. | 362/494 |
| 6,076,948 A | 6/2000 | Bukosky et al. | 362/494 |
| 6,086,229 A | 7/2000 | Pastrick | 362/494 |
| 6,099,153 A | 8/2000 | Zimmermann et al. | 362/494 |
| 6,099,155 A | 8/2000 | Pastrick et al. | 362/494 |
| 6,139,171 A | 10/2000 | Waldmann | 362/494 |
| 6,139,176 A | 10/2000 | Hulse et al. | 362/581 |
| 6,149,287 A | 11/2000 | Pastrick et al. | 362/494 |
| 6,176,602 B1 | 1/2001 | Pastrick et al. | 362/494 |
| 6,206,553 B1 | 3/2001 | Boddy et al. | 362/494 |
| 6,250,783 B1 | 6/2001 | Stidham et al. | 362/494 |
| 6,276,821 B1 | 8/2001 | Pastrick et al. | 362/494 |
| 6,280,067 B1 | 8/2001 | Mertens et al. | 362/494 |
| 6,280,068 B1 | 8/2001 | Mertens et al. | 362/494 |
| 6,280,069 B1 | 8/2001 | Pastrick et al. | 362/494 |
| 6,299,333 B1 | 10/2001 | Pastrick et al. | |
| 6,315,437 B1 | 11/2001 | Katz et al. | 362/494 |
| 6,367,957 B1 | 4/2002 | Hering et al. | 362/511 |
| 6,416,208 B2 | 7/2002 | Pastrick et al. | 362/494 |
| 6,474,853 B2 | 11/2002 | Pastrick et al. | |
| 6,296,379 B1 | 12/2002 | Pastrick et al. | 362/494 |
| 6,494,602 B2 | 12/2002 | Pastrick et al. | 362/494 |
| 6,568,839 B1 | 5/2003 | Pastrick et al. | 362/494 |
| 6,685,348 B2 | 2/2004 | Pastrick et al. | 362/494 |
| 6,902,306 B2 | 6/2005 | Pastrick et al. | 362/494 |
| 7,083,312 B2 | 8/2006 | Pastrick et al. | 362/494 |
| 7,140,755 B2 | 11/2006 | Pastrick et al. | |
| 7,334,925 B2 | 2/2008 | Pastrick et al. | |

FOREIGN PATENT DOCUMENTS

| | | |
|---|---|---|
| DE | 2634372 | 2/1978 |
| DE | 3614882 | 5/1987 |
| DE | 3635473 | 4/1988 |
| DE | 3635471 | 5/1988 |
| DE | 3803510 | 9/1988 |
| DE | 3803510 A | 9/1988 |
| DE | 9101029 | 5/1991 |
| DE | 4422572 | 1/1996 |
| DE | 19538771 | 4/1997 |
| DE | 29702746 | 5/1997 |
| DE | 19736482 | 2/1998 |
| EP | 0525541 | 11/1994 |
| EP | 0738627 A2 | 10/1996 |
| EP | 0820900 | 1/1998 |
| FR | 1031294 | 6/1953 |
| FR | 1461419 | 12/1966 |
| FR | 2612136 | 3/1988 |
| FR | 2618397 | 7/1988 |
| GB | 1555541 | 11/1979 |
| GB | 2129749 | 5/1984 |
| GB | 2154969 | 9/1985 |
| GB | 2161440 A | 1/1986 |
| GB | 2266870 | 11/1993 |
| GB | 2275329 A | 8/1994 |
| GB | 2316379 | 2/1998 |
| JP | 58188733 | 4/1983 |

| | | | | | | |
|---|---|---|---|---|---|---|
| JP | 60161646 | 10/1985 | | WO | WO 8901425 | 2/1989 |
| JP | 61218452 | 9/1986 | | WO | WO 9010555 | 9/1990 |
| JP | 62191246 A | 8/1987 | | | | |
| JP | 62218248 | 9/1987 | | | | |
| JP | 1239273 | 9/1989 | | | | |
| JP | 3050044 | 4/1991 | | | | |
| JP | 8142745 | 6/1996 | | | | |
| JP | 61188242 | 8/1996 | | | | |
| JP | 9095177 | 4/1997 | | | | |

OTHER PUBLICATIONS

Publication entitled "Ford Engineering Specification (ES)—Exterior Rearview Mirror", publication date unknown, pp. 15, 21, 126 and 114 only.

* cited by examiner

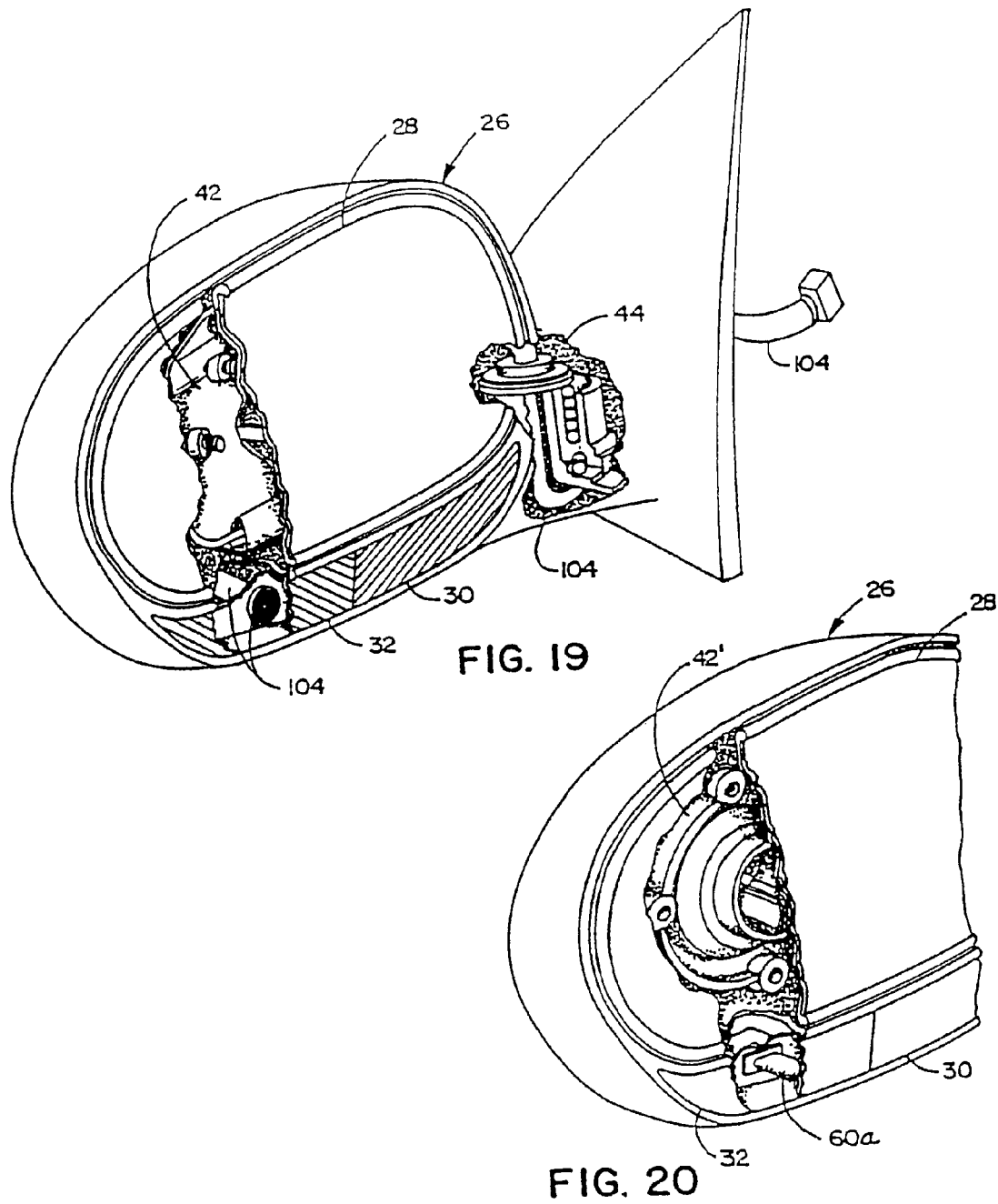

VEHICULAR EXTERIOR REARVIEW MIRROR ASSEMBLY

CROSS REFERENCE TO RELATED APPLICATIONS

This is a continuation of prior application Ser. No. 11/505,268, filed on Aug. 16, 2006, now U.S. Pat. No. 7,334,925, which is a continuation of application Ser. No. 10/287,565, filed Nov. 4, 2002, now U.S. Pat. No. 7,140,755, which is a continuation of application Ser. No. 09/938,182, filed on Aug. 23, 2001, now U.S. Pat. No. 6,474,853, which is a continuation of application Ser. No. 09/630,332, filed on Jul. 31, 2000, now U.S. Pat. No. 6,280,069, which is a continuation of application Ser. No. 09/420,658, filed on Oct. 19, 1999, now U.S. Pat. No. 6,099,155, which is a continuation of application Ser. No. 09/232,316, filed on Jan. 18, 1999, now U.S. Pat. No. 6,074,077, which is a continuation of application Ser. No. 08/934,490, filed on Sep. 19, 1997, now U.S. Pat. No. 5,863,116, which is a continuation of application Ser. No. 08/607,285, filed on Feb. 26, 1996, now U.S. Pat. No. 5,669,705, which is a continuation of application Ser. No. 08/333,412, filed on Nov. 2, 1994, now U.S. Pat. No. 5,497,305, which is a continuation of application Ser. No. 08/011,947, filed on Feb. 1, 1993, now U.S. Pat. No. 5,371,659.

BACKGROUND OF THE INVENTION

This invention relates generally to security systems for vehicles and, more particularly, to remotely actuated, personal safety lighting systems. The invention is particularly adapted to incorporation in the exterior mirrors of a vehicle.

Personal security in and around vehicles has become an important concern. In particular, an increasing number of assaults and robberies are committed in parking lots while occupants are entering and exiting vehicles. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

SUMMARY OF THE INVENTION

The present invention is intended to provide a personal safety feature for a vehicle in the form of a floodlight adapted to projecting light generally downwardly on an area adjacent a portion of the vehicle in order to create a lighted security zone in the area. Advantageously, the floodlight is preferably positioned in the housing of an exterior mirror having a reflective element also positioned in the housing. According to an aspect of the invention, an actuator is provided for the floodlight including a base unit in the vehicle and a remote transmitter. The base unit is responsive to a signal from the remote transmitter in order to actuate the floodlight. This allows the vehicle operator to actuate the floodlight from a distance in order to establish the security zone prior to approaching the vehicle.

According to another aspect of the invention, an actuator for the floodlight includes a lockout device in order to prevent actuation of the floodlight during operation of the vehicle. According to yet a further aspect of the invention, a signal light that is adapted to projecting light generally rearwardly of the vehicle is included in the exterior mirror housing. An actuator for the warning light is connected with the stoplight circuit, turn signal circuit, or both the stoplight and turn signal circuit, of the vehicle in order to actuate the warning light when either the stoplight or turn signal is being actuated.

According to yet another aspect of the invention, the floodlight is adapted to projecting a pattern of light from the housing on an area adjacent a portion of the vehicle that extends laterally onto the vehicle and downwardly and rearwardly of the vehicle. In this manner, a security zone is established from the vehicle door to the rear of the vehicle. The signal light is adapted to projecting a pattern of light extending laterally away from the vehicle and rearwardly of the vehicle. In this manner, the pattern generated by the signal light cannot be substantially observed by a driver of the vehicle. However, the pattern generated by the signal light may be observed by a driver of another vehicle passing the vehicle equipped according to the invention.

The floodlight and signal lights may be generated by a light emitting diode positioned in the housing, a vacuum fluorescent lamp positioned in the housing, an incandescent lamp positioned in the housing or a light source in the vehicle and a light pipe between the light source and the mirror housing.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. The provision for remote actuation of the security light provides a deterrent to ward off persons lurking around the protected vehicle while the users are still at a safe distance from the vehicle. The provision for a lockout circuit ensures that the security light will not inadvertently be actuated while the vehicle is in motion. The invention, further, conveniently combines a signal light that acts in unison with the vehicle's turn signal, brake light, or both, with the security light in an exterior mirror assembly. The signal light may be designed to be observed by other vehicles passing the equipped vehicle but not directly by the driver of the equipped vehicle.

These and other objects, advantages and features of this invention will become apparent upon review of the following specification in conjunction with the drawings.

BRIEF DESCRIPTION OF THE DRAWINGS

FIG. 19 is the same view as FIG. 7 of a fourth alternative light source; and

FIG. 20 is the same view as FIG. 7 of the invention embodied in an alternative mirror structure.

DESCRIPTION OF THE PREFERRED EMBODIMENT

Figure 1:
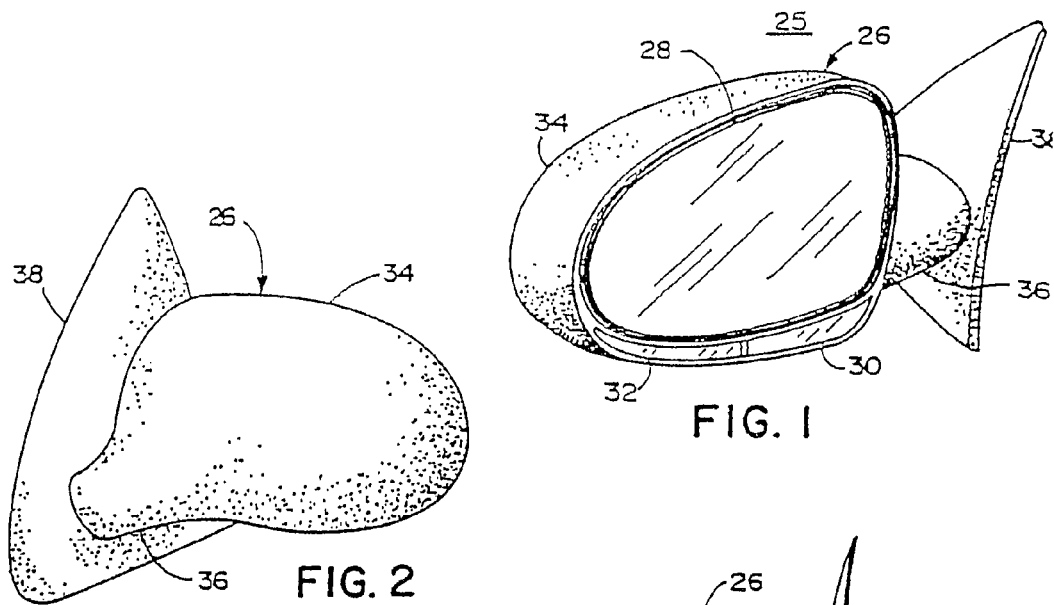
FIG. 1 is a perspective view taken from the front of a mirror assembly (rear of the vehicle) incorporating the invention.
Figure 2:
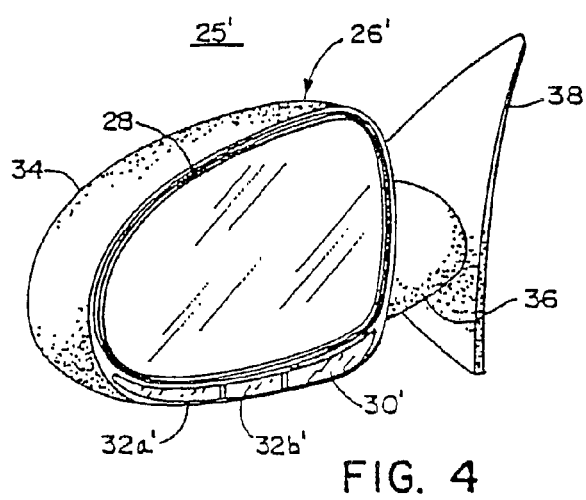
FIG. 2 is a rear view of the mirror assembly in FIG. 1.
Figure 3:
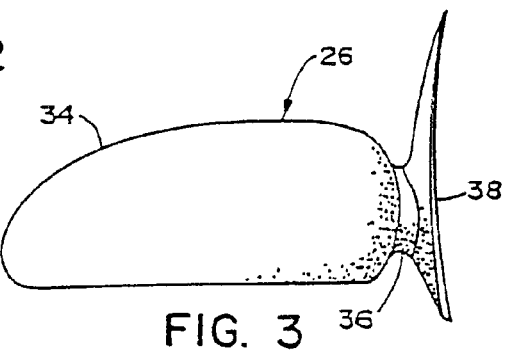
FIG. 3 is a top view of the mirror assembly in FIG. 1.

Referring now specifically to the drawings, and the illustrative embodiments depicted therein, a vehicle personal security lighting system 25 includes an exterior mirror assembly 26 having a conventional reflectance element 28, a security light 30, preferably white, or clear, and a signal light 32, preferably red, incorporated in a housing, or casing, 34. Casing 34 is connected by a neck 36 to a stationary panel or sail 38 adapted for incorporation with the forward portion of the vehicle side window assembly, and which mounts mirror assembly 26 to the door of a vehicle 40 (see FIG. 10). Reflectance element 28 may be any of several reflectors, such as glass coated on its first or second surface with a suitable reflective layer or layers, such as those disclosed in U.S. Pat. No. 5,179,471, the disclosure of which is hereby incorporated by reference herein, or an electro-optic cell including a liquid crystal, electrochromic, or electrochemichromic fluid, gel or solid-state compound for varying the reflectivity of the mirror in response to electrical voltage applied thereacross as disclosed in U.S. Pat. No. 5,151,824, the disclosure of which is hereby incorporated by reference herein.

Figure 7:
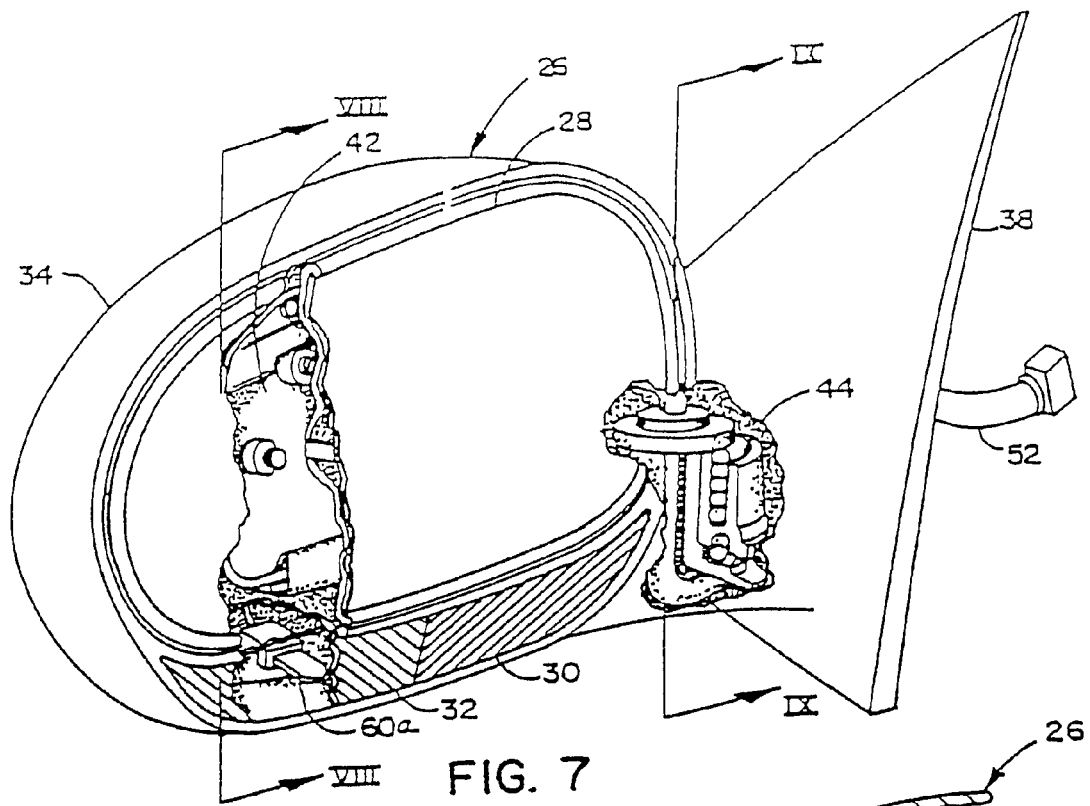
FIG. 7 is a breakaway perspective view of the system in FIG. 1 revealing internal components thereof.
Figure 9:
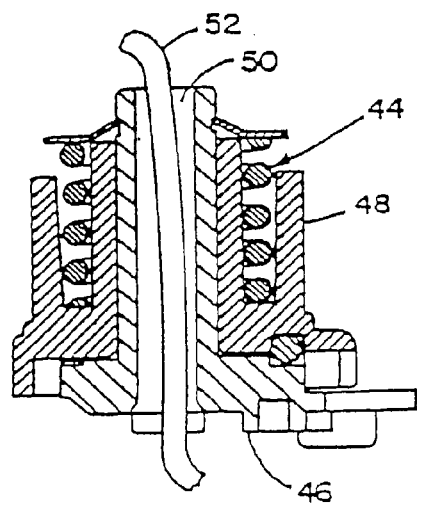
FIG. 9 is a sectional view taken along the lines IX-IX in FIG. 7.
Figure 8:
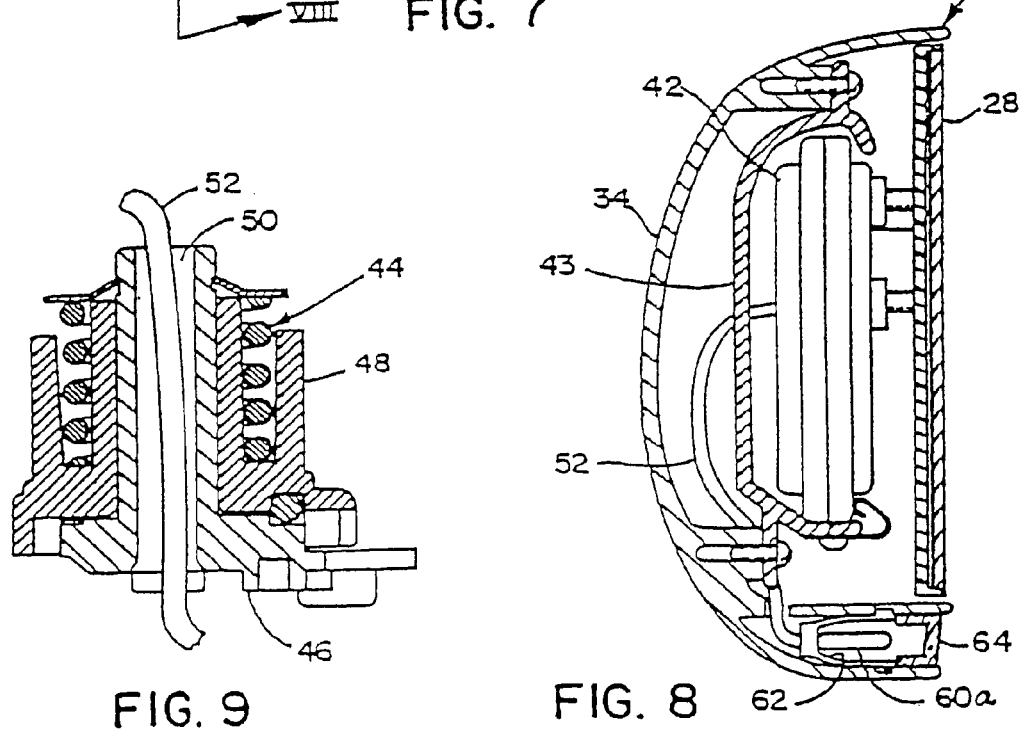
FIG. 8 is a sectional view taken along the lines VIII-VIII in FIG. 7.

With reference to FIGS. 7 and 8, as is conventional, reflectance element 28 is mounted to a bracket 43 by an actuator 42. Casing 34 is mounted to bracket 43. Actuator 42 provides remote positioning of reflectance element 28 on two orthogonal axes. Such actuators are well known in the art and may include a jackscrew-type actuator 42 such as Model No. H16-49-8001 (right-hand mirror) and Model No. H16-49-8051 (left-hand mirror) by Matsuyama of Kawagoe City, Japan, as illustrated in FIG. 7, or a planetary-gear actuator 42' such as Model No. 540 (U.S. Pat. No. 4,281,899) sold by Industrie Koot BV (IKU) of Montfoort, Netherlands, as illustrated in FIG. 20. As is also conventional, the entire casing 34 including actuator 42, 42' is mounted via bracket 43 for breakaway motion with respect to stationary panel 38 by a breakaway joint assembly 44. Breakaway joint assembly 44 (FIG. 9) includes a stationary member 46 attached to vehicle 40, a pivoting member 48 to which bracket 43 and casing 34 are attached, and a wire-way 50 through which a wire cable 52 passes. Wire cable 52 includes individual wires to supply control signals to actuator 42, 42', as well as signals to control the level of reflectivity, if reflective element 28 is of the variable reflectivity type noted above, such as an electrochromic mirror. Power may also be supplied through cable 52 for a heater (not shown) as disclosed in U.S. Pat. No. 5,151,824 in order to evaporate ice and dew from reflective element 28.

Figure 5:
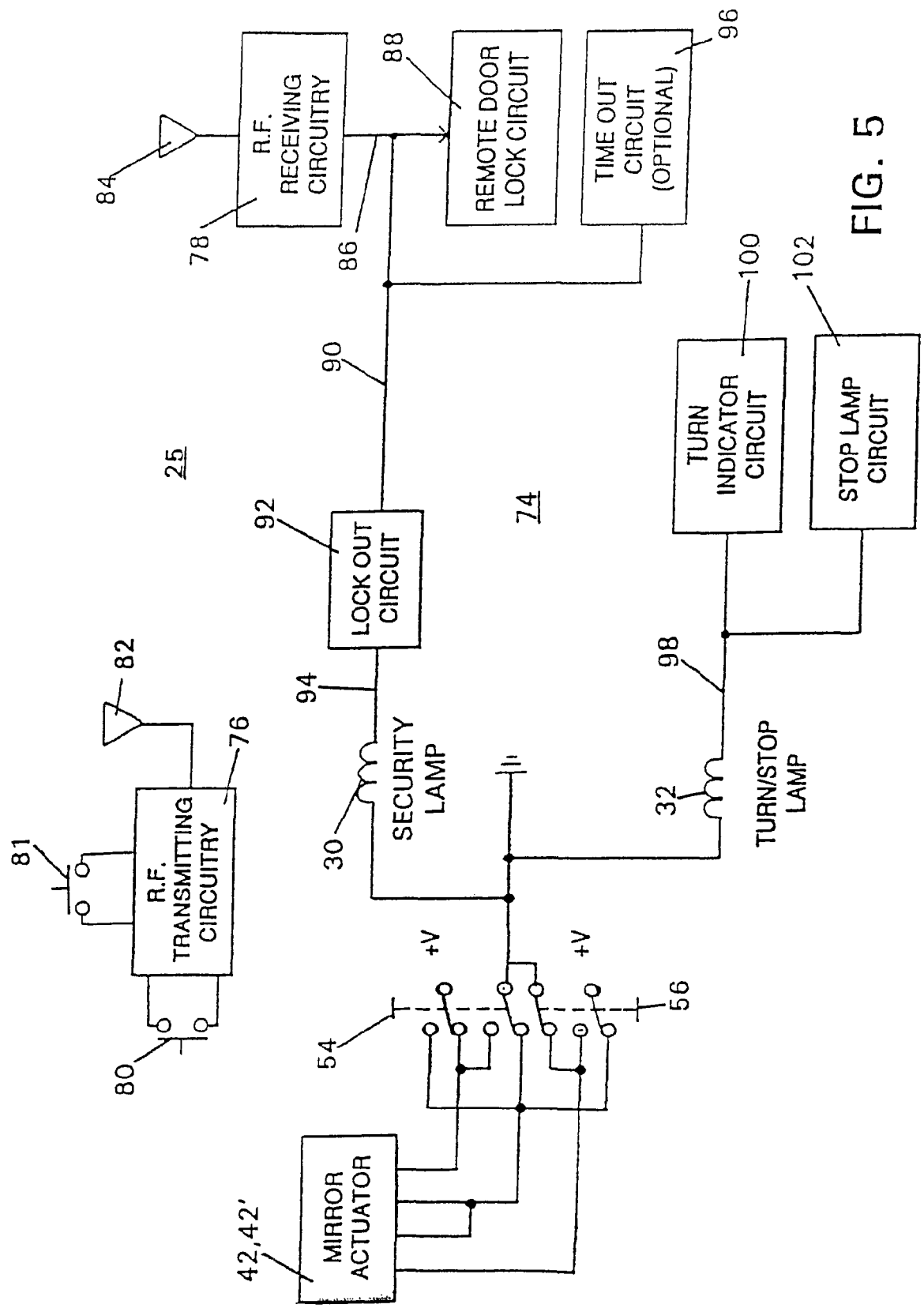
FIG. 5 is a block diagram of a control system according to the invention.

With reference to FIG. 5, actuator 42, 42' receives a first set of reversible voltage signals from a switch 54, in order to bidirectionally pivot in one axis, and a second set of reversible signals from a switch 56, in order to bidirectionally pivot in the opposite axis, as is conventional. Switches 54 and 56 are actuated by a common actuator (not shown) that is linked so that only one of the switches 54 and 56 may be actuated at a time. In this manner, actuator 42, 42' may utilize one common conductor for both switches 54, 56.

Figure 10:
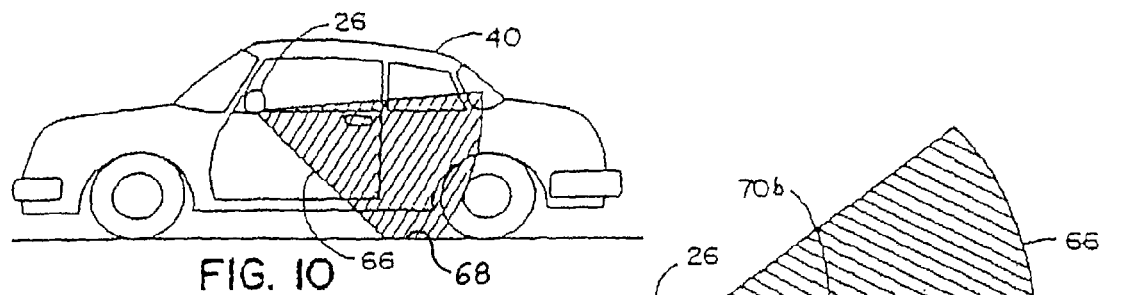
FIG. 10 is a side elevation of a vehicle illustrating the security zone light pattern generated by a security light according to the invention.
Figure 11:
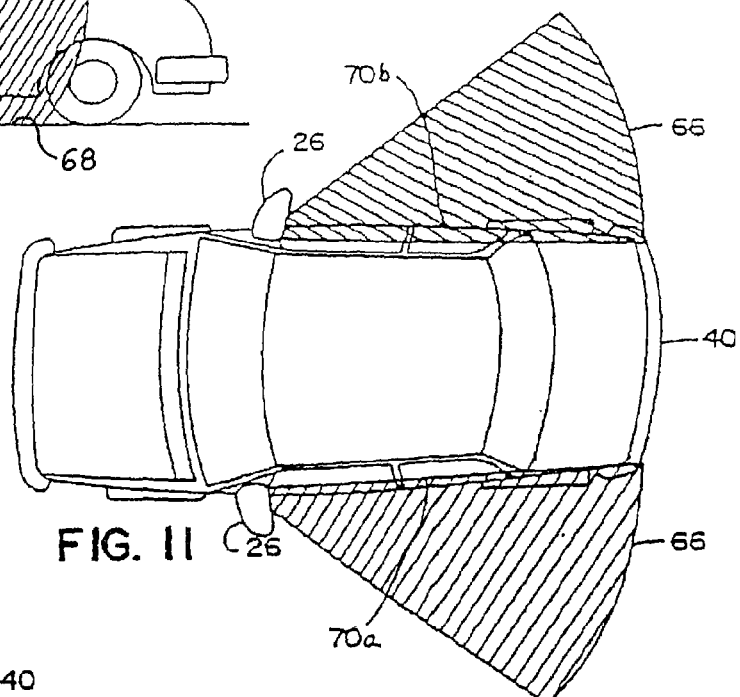
FIG. 11 is a top plan view of the vehicle and light pattern in FIG. 10.
Figure 12:
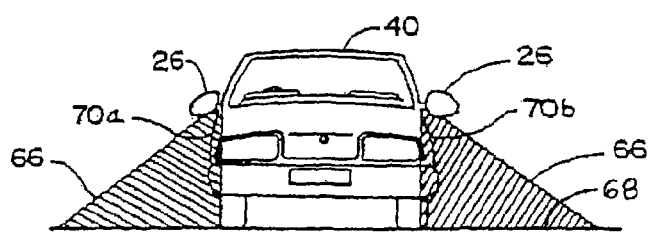
FIG. 12 is a rear elevation of the vehicle and light pattern in FIG. 10.

Each of the security light 30 and signal light 32 includes a light source 60 and reflector 62 behind a lens 64 (FIG. 8). Light source 60, reflector 62 and lens 64 are designed for security light 30 to project a pattern 66 of light, such as white light, through a clear, non-filtering lens, in order to establish a security zone around the vehicle (FIGS. 10-12). Pattern 66 extends rearward from mirror assembly 26. Vertically, pattern 66 contacts the ground at 68 in the vicinity of entry and exit by the vehicle occupants (FIGS. 10 and 12). Laterally, pattern 66 fans out into contact with the side 70a, 70b of the vehicle. This contact washes the sides of the vehicle to reflect the light in order to further illuminate the area in order to establish the security lighting zone (FIGS. 11 and 12). In a preferred embodiment, pattern 66 extends rearwardly from mirror assembly 26 without projecting any portion of the pattern forwardly of the mirror assembly.

Figure 13:
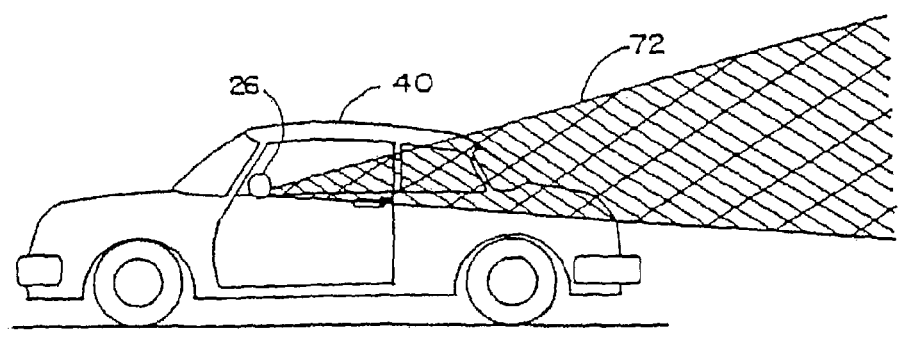
FIG. 13 is a side elevation of a vehicle illustrating the light pattern generated by a signal light useful with the invention.
Figure 14:
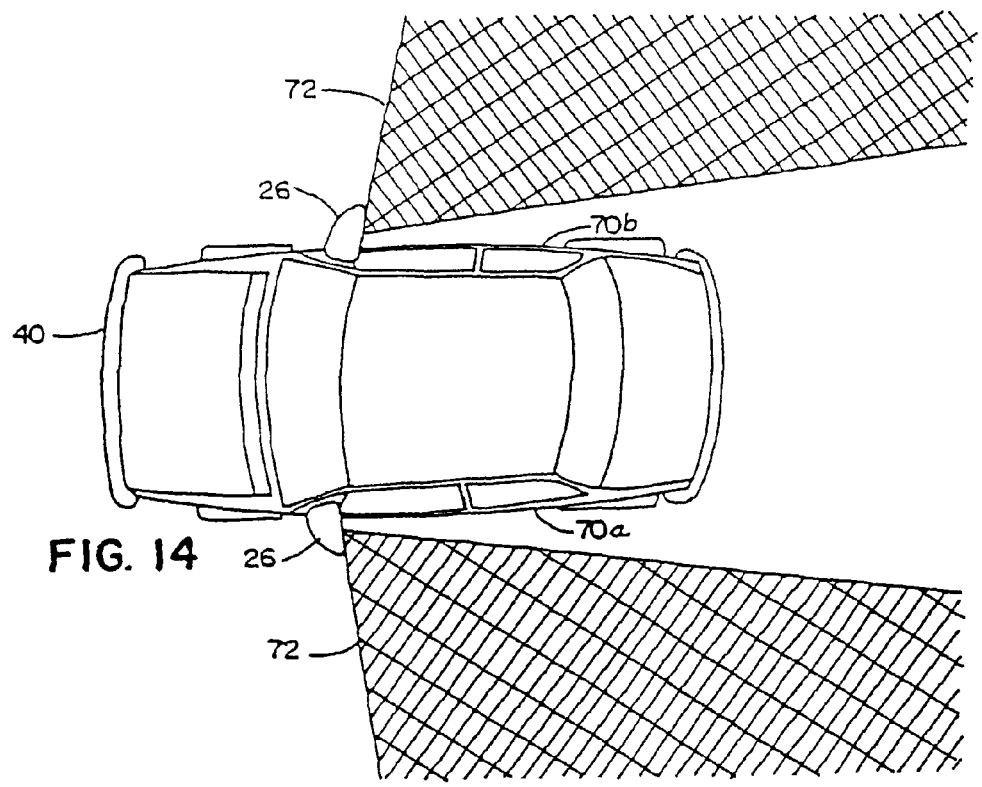
FIG. 14 is a top plan view of the vehicle and light pattern in FIG. 13.
Figure 15:
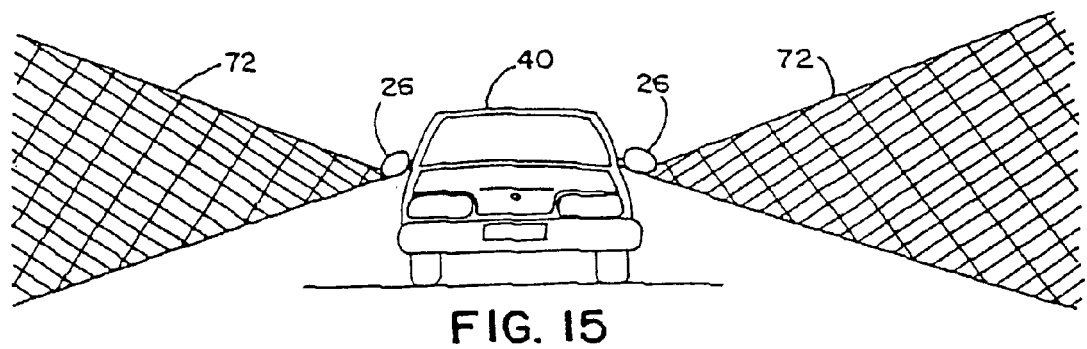
FIG. 15 is a rear elevation of the vehicle and light pattern in FIG. 13.

Signal light 32 generates a light pattern 72, which is directed generally horizontally rearwardly of vehicle 40 (FIGS. 13-15). Pattern 72 is laterally directed substantially away from side 70a, 70b of vehicle 40 so that the driver of vehicle 40 does not directly intercept pattern 72, although a minor intensity (such as 10%) of the pattern is intercepted by the driver in order to provide awareness of the actuating of the signal light. Pattern 72 fans laterally away from side 70a, 70b to an extent that is parallel the face of reflectance element 28, which is substantially perpendicular to side 70a, 70b (FIG. 14). Thus, the driver of another vehicle (not shown) passing vehicle 40 on the left or right side of vehicle 40 will intercept pattern 72 while the vehicle is behind and beside vehicle 40. Although, in an illustrated embodiment, lens 64 of signal light 32 is substantially planar, lens 64 of signal light 32 could be made to wrap around the outward side of casing 34 in order to function as a side marker for the vehicle as is required in some European countries.

Vehicle mirror assembly security system 25 is actuated by a control system 74 (FIG. 5). Control system 74 includes means for actuating security light 30 including a remote transmitting device 76 and a stationary receiving device 78. Transmitting device 76 may be remotely carried by the vehicle operator and includes switches 80 and 81 in order to actuate the transmitting circuitry to transmit a signal form antenna 82, which is received by antenna 84 of receiving device 78. Receiving device 78 is mounted in the vehicle, such as in the vehicle trunk compartment, and includes an output 86 in order to operate remote door lock circuit 88, as is conventional. Output 86 is, additionally, provided as an input 90 of a lockout circuit 92, whose output 94 is supplied to security lamp 30. Input 90 may additionally be actuated by a timeout circuit 96, which is conventionally supplied in a vehicle in order to dim the interior lights, following a slight delay, after the occurrence of an event, such as the opening and closing of the doors of the vehicle. Signal light 32 is actuated on line 98 from either a turn indicator circuit 100 or a stop lamp indicator circuit 102, both of which are conventionally supplied with vehicle 40.

In operation, when the operator actuates switch 80 of transmitting device 76, receiving device 78 produces a signal on output 86 in order to cause remote door lock circuit 88 to unlock the doors. Alternatively, actuation of switch 81 on remote transmitting device 76 causes receiving device 78 to produce a signal on output 86 to cause remote door lock circuit 88 to lock the vehicle doors. The signal on output 86 actuates security lamp 30 provided that lockout circuit 92 does not inhibit the signal. Lockout circuit 92 responds to operation of the vehicle in order to avoid actuation of security lamp 30 when the vehicle is in motion. Such lockout circuits are conventional and may be responsive to placing of the vehicle transmission in gear of sensing of the speed of the vehicle, or the like. Security lamp 30 is also actuated, in response to interior lighting device timeout circuit 96, whenever the interior lights of the vehicle are being actuated by timeout circuit 96, provided that lookout circuit 92 does not inhibit the signal from security lamp 30. This is provided in order to allow security lamp 30 to be actuated in response to the entry to, or exit from, vehicle 40 without the operator utilizing transmitting device 76 to lock or unlock the doors. Signal lamp 32 is actuated in response to turn indicator circuit 100 whenever the operator moves the indicator stick in the direction of that particular signal lamp 32. Signal lamp 32 may additionally be actuated from stop lamp circuit 102 in response to the driver actuating the vehicle's brakes.

In the embodiment illustrated in FIGS. 1 and 5, lens 64 of signal lamp 32 is adapted to filter the light provided from lamp 32 so as to be red and is provided for vehicles 40 in which the stop lamps and rear turn indicator lamps are, likewise, red. Because signal lamp 32 shines red, pattern 72 is restricted from extending forward of the vehicle. This is in order to comply with regulations prohibiting red lights from causing confusion with emergency vehicles by shining forward of the vehicle.

Figure 4:
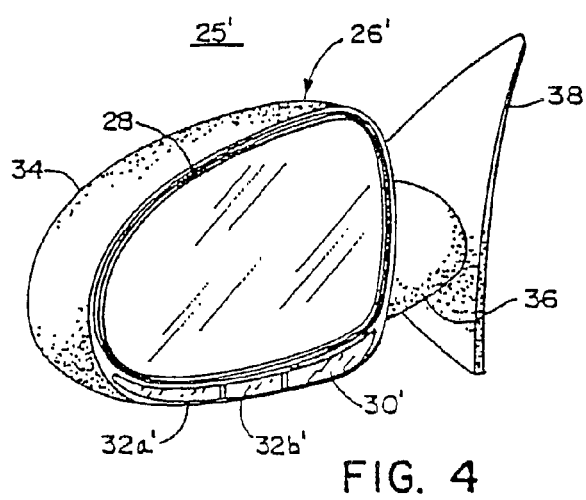
FIG. 4 is the same view of FIG. 1 of an alternative embodiment of the invention.
Figure 6:
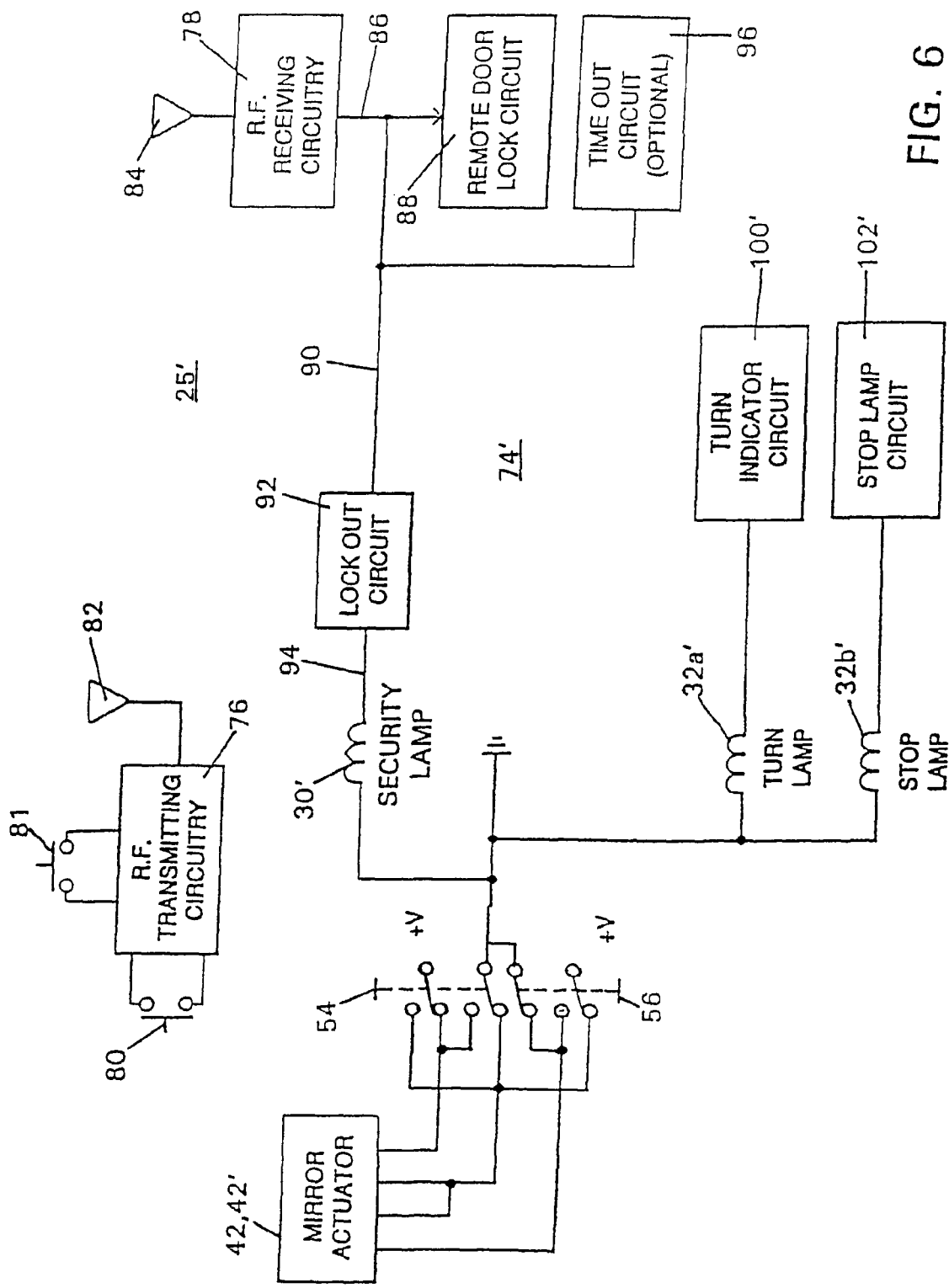
FIG. 6 is a block diagram of an alternative embodiment of a control system according to the invention.

For vehicles having red stoplights and amber turn indicators in the rear, a vehicle mirror security assembly 25' includes an exterior mirror assembly 26' and a control system 74' (FIGS. 4 and 6). Exterior mirror assembly 26' includes a security light 30', preferably white or clear, and a pair of signal lights 32a' and 32b'. Signal light 32a' is amber and is actuated directly from turn indicator circuit 100'. This amber color can be provided either by an amber light bulb or source, or a filtering lens providing an amber color. Signal light 32b' is red and is actuated directly from stop lamp circuit 102'. Each of the light patterns generated by signal lights 32a' and 32b' substantially correspond with light pattern 72. The light pattern generated by security light 30' is substantially equivalent to pattern 66. With the exception that turn signal indicator circuit 100' actuates signal light 32a' and stop lamp circuit 102' actuates signal light 32b', control system 74' operates substantially identically with control circuit 74.

Figure 16:
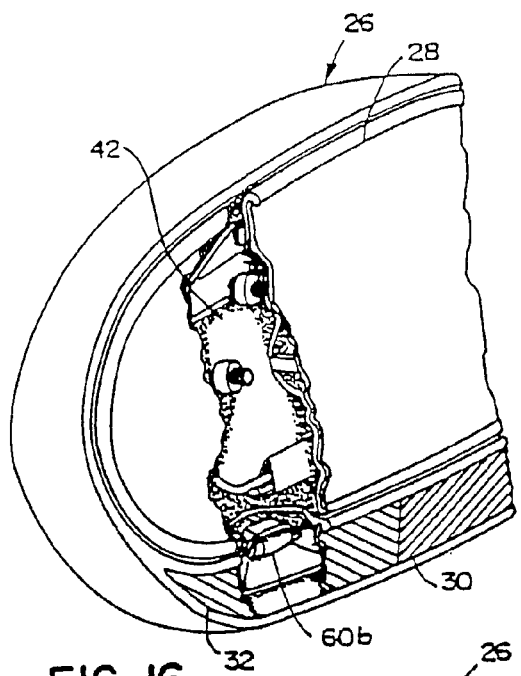
FIG. 16 is the same view as FIG. 7 of a first alternative light source according to the invention.
Figure 17:
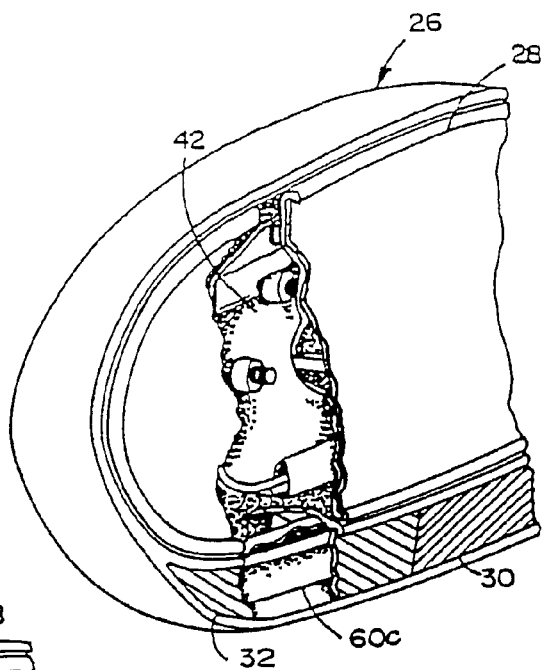
FIG. 17 is the same view as FIG. 7 of a second alternative light source.
Figure 18:
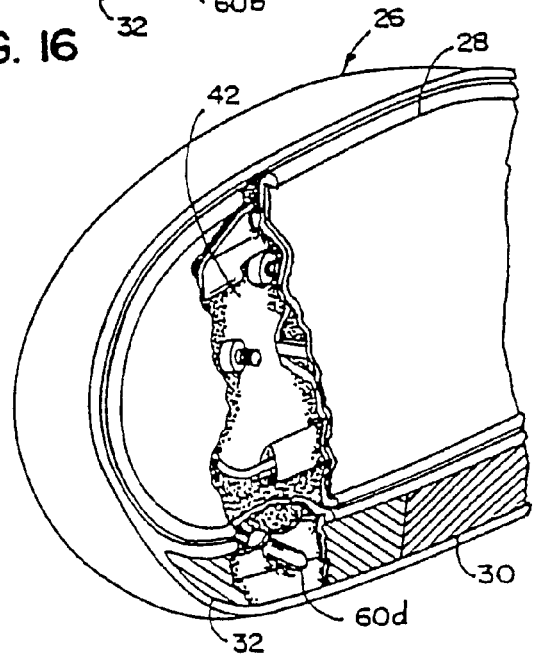
FIG. 18 is the same view as FIG. 7 of a third alternative light source.

In the illustrated embodiment, light source 60, for both security light 30 and signal light 32, may be supplied as a conventional incandescent or halogen lamp 60a (FIG. 7). Alternatively, a conventional incandescent fuse lamp 60b may be used (FIG. 16). Alternatively, a vacuum fluorescent lamp 60c, which is available in various colors, may be used (FIG. 17). Alternatively, a light emitting diode 60d may be used (FIG. 18). As yet a further alternative, a fiber optic bundle 104 forming a light pipe may be positioned to discharge light behind lens 64. Fiber optic bundle 104 passes through breakaway joint 44 in wire-way 50 in order to transmit light from a source (not shown) within vehicle 40. By way of example, lens 64 may be supplied as a segmented lens, a prismatic lens, or a Fresnel lens in order to generate light patterns 66 and 72. Bracket 43 and breakaway joint 44 are marketed by Donnelly Corporation, the present assignee, of Holland, Mich. The remote actuator composed of remote transmitting device 76 and stationary receiving device 78 may be radio frequency coupled, as is conventional. Alternatively, they may be infrared coupled as illustrated in U.S. Pat. No. 4,258,352.

Although the invention is illustrated in a mirror assembly utilizing an automatic remote actuator, it may also be applied to manual remote actuators and handset actuators. As previously set forth, reflectance element 28 may be conventional or may be supplied as an electrochromic self-dimming mirror. Although the invention is illustrated with breakaway joint 44, the invention may also be applied to mirrors that are rigidly mounted to the vehicle.

Changes and modifications in the specifically described embodiments can be carried out without departing form the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. A vehicular exterior rearview mirror assembly suitable for mounting to a side of a vehicle, said exterior rearview mirror assembly comprising:

a reflectance element that is positionable by operation of an electrically-operable actuator;

a turn signal light including at least one light-emitting diode;

said turn signal light separate from said reflectance element;

said turn signal light configured, when the vehicular exterior rearview mirror assembly is mounted to the side of an equipped vehicle and when said turn signal light is electrically powered, to project a beam of light that is directed at least rearward of the equipped vehicle and that is observable to a driver of a second vehicle overtaking in an adjacent side lane from behind the equipped vehicle, said beam of light of said turn signal light being substantially unobserved by a driver of the equipped vehicle and providing a warning indication to the driver of the second vehicle overtaking the equipped vehicle that a lane change by the equipped vehicle is intended;

a ground illumination light;

said ground illumination light separate from said reflectance element; and said ground illumination light configured, when the vehicular exterior rearview mirror assembly is mounted to the side of the equipped vehicle and said ground illumination light is electrically powered, to project a beam of light at least generally downwardly on at least one of (a) said side of the equipped vehicle and (b) a ground area adjacent an ingress or egress portion of the equipped vehicle in order to create a lighted security zone.

2. The mirror assembly of claim 1, wherein at least one of said turn signal light and said ground illumination light comprises a lens.

3. The mirror assembly of claim 1, wherein said beam of light of said turn signal light comprises one of red colored light and amber colored light.

4. The mirror assembly of claim 1, wherein said turn signal light comprises a reflector.

5. The mirror assembly of claim 1, wherein said ground illumination light comprises at least one light-emitting diode.

6. The mirror assembly of claim 5, wherein said beam of light of said ground illumination light comprises white light.

7. The mirror assembly of claim 6, wherein said beam of light of said ground illumination light extends laterally onto the side of the equipped vehicle and wherein the lighted security zone encompasses the ground in the vicinity of entry and exit by occupants of the equipped vehicle.

8. A vehicular exterior rearview mirror assembly suitable for mounting to a side of a vehicle, said exterior rearview mirror assembly comprising:

a reflectance element that is positionable by operation of an electrically-operable actuator;

a turn signal light including one of (a) at least one red light-emitting diode and (b) at least one amber light-emitting diode;

said turn signal light separate from said reflectance element;

said turn signal light configured, when the vehicular exterior rearview mirror assembly is mounted to the side of an equipped vehicle and when said turn signal light is electrically powered, to project a beam of light that is directed at least rearward of the equipped vehicle and that is observable to a driver of a second vehicle overtaking in an adjacent side lane from behind the equipped vehicle, said beam of light of said turn signal light being substantially unobserved by a driver of the equipped vehicle and providing a warning indication to the driver of the second vehicle overtaking the equipped vehicle that a lane change by the equipped vehicle is intended;

a ground illumination light;

said ground illumination light separate from said reflectance element; and said ground illumination light configured, when the vehicular exterior rearview mirror assembly is mounted to the side of the equipped vehicle and said ground illumination light is electrically powered, to project a beam of light at least generally downwardly onto said side of the equipped vehicle and onto a ground area adjacent at least a front door of the equipped vehicle in order to create a lighted security zone.

9. The mirror assembly of claim 8, wherein at least one of said turn signal light and said ground illumination light comprises a lens.

10. The mirror assembly of claim 8, wherein said beam of light of said turn signal light comprises amber colored light.

11. The mirror assembly of claim 10, wherein said turn signal light comprises a reflector.

12. The mirror assembly of claim 8, wherein said ground illumination light comprises at least one light-emitting diode.

13. The mirror assembly of claim 12, wherein said beam of light of said ground illumination light comprises white light.

14. The mirror assembly of claim 8, wherein the lighted security zone encompasses the ground in the vicinity of entry and exit by occupants of the equipped vehicle.

15. A vehicular exterior rearview mirror assembly suitable for mounting to a side of a vehicle, said exterior rearview mirror assembly comprising:

a reflectance element that is positionable by operation of an electrically-operable actuator;

a turn signal light including at least one light-emitting diode;

said turn signal light separate from said reflectance element;

said turn signal light configured, when the vehicular exterior rearview mirror assembly is mounted to the side of an equipped vehicle and when said turn signal light is electrically powered, to project a beam of light that is directed at least rearward of the equipped vehicle and that is observable to a driver of a second vehicle overtaking in an adjacent side lane from behind the equipped vehicle, said beam of light of said turn signal light being substantially unobserved by a driver of the equipped vehicle and providing a warning indication to the driver of the second vehicle overtaking the equipped vehicle that a lane change by the equipped vehicle is intended;

a ground illumination light;

said ground illumination light separate from said reflectance element;

said ground illumination light configured, when the vehicular exterior rearview mirror assembly is mounted to the side of the equipped vehicle and said ground illumination light is electrically powered, to project a beam of light at least generally downwardly a ground area adjacent an ingress or egress portion of the equipped vehicle in order to create a lighted security zone; and wherein said beam of light of said ground illumination light and wherein the lighted security zone encompasses the ground in the vicinity of entry and exit by occupants of the equipped vehicle.

16. The mirror assembly of claim 15, wherein each one of said turn signal light and said ground illumination light comprises a lens.

17. The mirror assembly of claim 16, wherein said beam of light of said turn signal light comprises one of red colored light and amber colored light.

18. The mirror assembly of claim 17, wherein said turn signal light comprises a reflector.

19. The mirror assembly of claim 18, wherein said ground illumination light comprises at least one light-emitting diode.

20. The mirror assembly of claim 19, wherein said beam of light of said ground illumination light comprises white light.

21. The mirror assembly of claim 20, wherein said beam of light of said ground illumination light extends laterally onto the side of the equipped vehicle.

* * * * *

UNITED STATES PATENT AND TRADEMARK OFFICE
CERTIFICATE OF CORRECTION

Page 1 of 1

PATENT NO. : 7,784,983 B2
APPLICATION NO. : 12/037409
DATED : August 31, 2010
INVENTOR(S) : Todd W. Pastrick, Linda K. Molenkamp and Roger L. Koops It is certified that error appears in the above-identified patent and that said Letters Patent is hereby corrected as shown below:

Title Page,

Item (57) ABSTRACT

"A vehicular exterior rearview mirror assembly has a reflectance element that is positionable by operation of electrically-operable actuator, and a turn signal light that is separate from the reflectance element and configured to project a beam of light that is directed at least rearward and that is observable to a driver of a second vehicle overtaking in an adjacent side lane. The beam of light is substantially unobserved by a driver of the equipped vehicle and provides a warning indication to the driver of the overtaking second vehicle that a lane change is intended. The mirror assembly includes a ground illumination light, separate from the reflectance element, configured to project abeam downwardly on at least one of (a) the side of the equipped vehicle and (b) a ground area adjacent an ingress or egress portion of the equipped vehicle."

should be

--A vehicular exterior rearview mirror assembly has a reflectance element that is positionable by operation of an electrically-operable actuator, and a turn signal light that is separate from the reflectance element and configured to project a beam of light that is directed at least rearward and that is observable to a driver of a second vehicle overtaking in an adjacent side lane. The beam of light is substantially unobserved by a driver of the equipped vehicle and provides a warning indication to the driver of the overtaking second vehicle that a lane change is intended. The mirror assembly includes a ground illumination light, separate from the reflectance element, configured to project a beam of light at least generally downwardly on at least one of (a) the side of the equipped vehicle and (b) a ground area adjacent an ingress or egress portion of the equipped vehicle.--

Signed and Sealed this
Twenty-first Day of February, 2012

David J. Kappos
*Director of the United States Patent and Trademark Office*